United States Patent Office 3,649,457
Patented Mar. 14, 1972

3,649,457
ENZYMATIC PROCESSING WITH POLYMER-ENZYME PRODUCT
Thomas L. Westman, St. Louis, Mo., assignor to Monsanto Company, St. Louis, Mo.
No Drawing. Filed Sept. 27, 1968, Ser. No. 763,368
Int. Cl. C07g 7/02; C12k 1/00
U.S. Cl. 195—68
18 Claims

ABSTRACT OF THE DISCLOSURE

Polymer-enzyme products, in which enzyme is covalently bound, are employed in processing by containing them, preferably in solution, in a reaction zone, at least one boundary of which is defined by a semi-permeable membrane having exclusion limits selected to exclude passage therethrough of enzyme-polymer product (EPP), especially water-soluble enzyme-polymer product (SEPP), but allow passage therethrough of smaller molecular weight reaction products. Exclusion limits of membrane may also prevent passage therethrough of substrate, which is introduced into the reaction zone and contacted with EPP, especially SEPP, therein. Products of the enzymatic reaction pass through the membrane and are recovered. Additional substrate may then be introduced into reaction zone. EPP, including SEPP, may be recycled in the process.

BACKGROUND OF INVENTION (1) Field of invention

Enzyme-polymer products (EPP); enzymatic processing therewith.

(2) Prior art

Some water-insoluble enzyme-polymer products (IEPP) are known. Water-soluble enzyme-polymer products (SEPP) have recently become available and are the subject matter of other applications on behalf of the present inventor. Reference is also made to the following three applications, filed even date herewith, for further details of novel polymer-enzyme products which are more fully described hereinafter. These are Ser. Nos.: 763,370, 763,-343, 763,384 now U.S. Pat. 3,502,545. Such products are enzymatically active, and have wide applicability as stable, long-acting enzymatic materials, having in general the same type of activity as the parent enzyme, but frequently with different pH optimum activity and range of applicability. Water-insoluble enzyme-polymer products (IEPP) are stable, substantially colorless and odorless, long-acting and not subject to autogenous deterioration or destruction by other enzymes. In these respects the SEPP are like the corresponding insoluble enzyme-polymer products (IEPP), but in addition they have the advantage of a capacity for intimate contact with the substrate upon which it is desired to conduct the enzymatic reaction when in aqueous solution. They are in both forms recoverable for reuse or recycling in enzymatic processing with a high degree of retention of their initial enzymatic activity.

However, it has become apparent that recovery of these water-soluble polymer-enzyme materials (SEPP) from products of enzymatic processing is not always a simple matter. Moreover, recovery of the products of the enzymatic digestion of a selected substrate from the SEPP is likewise attended by considerable difficulty. Even where the enzymatically active reactant is an insoluble polymer-enzyme products (IEPP), it has been found that separation of the end-products, of the enzymatic reaction on a substrate employing the insoluble enzyme-polymer product, from the IEPP can be accomplished only with considerable difficulty after completion of the reaction.

Accordingly, it would be highly desirable to have available a method of processing with the novel enzymatically active enzyme-polymer products, especially SEPP, which permitted a ready, rapid, and facile recovery of the products of the enzymatic digestion of a selected substrate substantially free from EPP and which in addition would permit a conventient purification of the EPP after it had once been used for reaction upon a selected substrate, as by the employment of solvent, without loss of the enzymatically-active EPP itself, especially when in water-soluble form, or at least permit an operation whereby the enzymatically active enzyme-polymer product could be conveniently dissociated or unattached from unreacted protein and other substrates. Such a process is provided by the present invention.

SUMMARY OF THE INVENTION

The present invention provides a process for the enzymatic reaction upon a selected substrate by an enzymatically active polymer-enzyme product which permits rapid and facile recovery of products of the reaction substantially uncontaminated with enzyme-polymer product, even though SEPP, and which allows purification or re-vivification of the enzymatically active polymer-enzyme product before reuse by means of a selected solvent, without loss of the enzymatically active EPP itself in spite of its water-solubility when a SEPP.

The process of the invention involves the confinement or containment of the enzymatically active enzyme-polymer product in a reaction zone having as one of its boundaries a semipermeable membrane having exclusion limits designed to permit passage therethrough of products of the enzymatic reaction but exclude passage therethrough of the EPP, even though in water-soluble form, and in some cases also the substrate reactant.

Thus, a water-soluble enzyme-polymer material may be contained in an enzymatic reaction chamber having a bounding area thereof comprised of a semipermeable membrane. This porous membrane possesses the capacity of permitting passage of lower molecular weight substances but not those of higher molecular weight, including especially the enzymatically active water-soluble enzyme-polymer derivative. The water-soluble enzyme-polymer product is used to enzymatically treat substrates in such a manner that, after treatment, products from digestion of the substrate are separated from the soluble enzyme-polymer product (SEPP) by passage through the size-limiting semipermeable membrane, whereas the SEPP, if desired together with the unreacted selected starting substrate, remains behind for subsequent isolation, reuse, or recycling if desired.

As one example of this technique may be mentioned the following: SEMAT (soluble EMA-tryspin) and aqueous buffer solution, preferably at a pH of 9 or thereabout, is placed in a Diaplex Ultrafil Model 400 Cell (TM-Amicon Corp., Cambridge, Mass.) the boftom of which comprises a UM–1 Diaflo (TM) membrane (Amicon Corp.) having exclusion limits of about 10,000. Performic acid oxidized bovine ribonuclease (RIBOX) dissolved in the aqueous buffer is placed in the chamber with the SEMAT solution and the mixture is stirred. The reaction is allowed to proceed for a predetermined period, and the digested RIBOX fragments are separated by passage through the membrane either during or after reaction by application of pressure and solvent, whereas the SEMAT and any unreacted RIBOX (oxidized ribonuclease) remain in the reaction chamber. The vessel may subsequently be recharged with RIBOX solution, the digestion again allowed to proceed, and the products again isolated as indicated. Thus, depending upon the length of time required or permitted for the enzymatic reaction in the enzymatic reaction chamber, the method fo the present invention provides a procedure for continuous, semi-continuous, or batchwise biological treatment of substrate, fractionation of products from enzymatically active starting material, and in many cases also from unreacted starting substrate, with subsequent reuse of the enzymatically-active insoluble or soluble polymer-enzyme derivative employed as biological catalyst in the process.

Other reaction chambers are suitable. The only prerequisites are that the starting reactants can be contained therein and that the chamber have an exit which can conveniently be blocked with a semipermeable membrane as described. If lower or higher molecular weight products are produced, membranes having lower or higher exclusion limits may be employed. For example, a UM-2 Diaflo (TM) membrane may be employed to permit passage from the reaction zone of reaction products having a molecular weight no greater than about 1000. Membranes are also available which permit passage of larger molecular weight products, e.g., at numerous intermediate exclusion limits up to about 50,000, such as the Diaflo (TM) Model XM-50. By judicious employment of reaction conditions and membranes, with suitable selection of starting substrate and starting enzyme-polymer product, the process may be applied to procure ready and facile separation of end products of any such enzyme-polymer and substrate reaction. The reaction zone or chamber is preferably also provided with means permitting the application of a pressure differential to opposite sides of the diaphragm or membrane, so as to "open" the membrane by creation of such pressure differential periodically and either maximally or partially, for exhausting of the reaction products at the termination of the reaction, or continuously or semicontinuously if desired. Moreover, if it is desired to conduct the process on a continuous or semicontinuus basis, means for introducing or feeding additional substrate, as in solution continuously or semicontinuously, should also be provided, and such further introduction of starting substrate is most conveniently accomplished while a pressure differential on the membrane is being effected and by means thereof. In case a water-insoluble enzyme-polymer product is used as enzymatic agent in the process, the results are not always so dramatic as with the SEPP, but the IEPP is nevertheless maintained in the reaction zone for reuse whereas the reaction products exit the reaction chamber upon opening of the membrane and can be recovered conveniently with substantial freedom from the IEPP, which on the other hand may be most conveniently washed or otherwise purged of reaction products and also washed free of unreacted substrate or partial reaction products and thus readied for use and recycling.

Substrate

According to the invention, the starting substrate may be any substrate, ordinarily of an organic nature, which is subject to enzymatic reaction to produce a reaction product. The substrate may be of either high or low molecular weight. It may be biologically active or non-biologically active in nature. If it is a protein or a polypeptide, or other high molecular weight material, enzymatic reaction with the enzyme-polymer product (EPP) in the enzymatic reaction chamber will ordinarily produce products of the reaction of lower molecular weight than the starting substrate. In such case, the products of the reaction, upon "opening" of the membrane, e.g., by applying a pressure differential to the opposite sides of the membrane as by pressure or vacuum or both, will pass through the membrane and be recovered substantially free not only of the starting EPP but also substantially free of starting substrate from which produced by the enzymatic reaction. Carbohydrates, starches, cellulosic materials, lipids, and the like may also be employed as starting substrate, together with the starting enzyme-polymer product having a suitable and selected enzymatic activity for production of the desired result. The selection of a suitably enzymatically active enzyme-polymer product and corresponding substrate for the accomplishment of a desired result and production of a desired end product is well within the knowledge of one skilled in the enzyme art at this stage of the development thereof. If the substrate is of low molecular weight, then it may also pass through the membrane simultaneously with the enzymatic reaction product upon "opening" of the membrane, in which case separation of the reaction product from the residual unreacted starting substrate will be effected subsequent to passage of the product of the reaction through the membrane and recovery thereof. Representative additional high molecular weight substrates which may be treated enzymatically according to the invention include those already named and those specifically employed in the following examples, and numerous others which will immediately be apparent to one skilled in the art. Representative of lower molecular weight substrates which may be treated enzymatically according to the method of the invention are urea, lower molecular weight esters and amides, including lower molecular weight peptides, and the like, and numerous others will immediately be apparent to one skilled in the art.

ENZYME-POLYMER PRODUCTS AND THEIR PREPARATION

Definitions

"EMA" is a polymer of ethylene and maleic anhydride. Polymers of this type are of great value according to the present invention.

"EMA type" polymer is defined hereinafter.

"EMA-enzyme" or "EMA/enzyme" (or the reverse) is a copolymer of ethylene and maleic anhydride having enzyme covalently bonded thereto. The product is the same whether the enzyme is reacted directly with an anhydride group of the ethylene-maleic anhydride copolymer or with a carboxyl group of ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such non-participating groups may, however, be converted to amide, imide, ester, et cetera, groups, as can be present in EMA-type polymers, as hereinafter defined.

"Water-insoluble" means that the product concerned does not dissolve in water or aqueous solutions, although it may have such characteristics as a high degree of swelling due to water solvation, even to the extent of existence in gel form.

"Water-soluble" means not water-insoluble, and is further characterized in that the product concerned dissolves in water or aqueous solutions. As usual, however, this does not mean that the product dissolves completely at all concentrations or at all pH's. On the other hand, these water-soluble products are characterized by being soluble at a variety of concentrations of pH's, and they are generally soluble at pH's of 7 or greater.

In their water-soluble form, the polymer-enzyme products (SEPP) are characterized by fundamentally the same enzymatic activity as the parent native enzyme, but have all of the advantages which are attendant upon applicability in solution or suspension form together with increased stability and prolonged activity. In addition, because of their polymeric form, even though soluble, the enzyme-polymer products are separable from native enzyme or substrates, as well as impurities and coloring matter of an undesired nature, by normal separation procedures such as centrifugation, electrophoresis, or chromatography. The EPP used according to the present invention may be any of those previously known or disclosed herein, but is preferably a SEPP.

Polymer-enzyme derivatives can be prepared by reacting the crystalline or crude enzyme or mixture of enzymes with the polymer in solution, resulting in formation of a polymeric product in which the enzyme is covalently bound. When an anhydride or carboxyl is present in the polymer, e.g., an EMA-type polymer, covalent bonding of the enzyme to the polymer may be effected directly through reaction or coupling with an anhydride group or with a carboxyl group using a carboxyl activating agent. The product is the same in both cases. The pH range for the reaction depends upon the enzyme employed and its stability range. It is usually about 5 to 9.5, preferably about 6–8, but adjustment must of course be made for individual cases. Isolation and purification is generally effected according to normal biochemical procedures, and by the more specific procedure which follows. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active polymer-enzyme derivative, but degree of activity imparted to the polymeric product is sometimes lower than desired, possible due to partial inactivation of the enzyme during the process. Resort may frequently advantageously be had to employment of a mixed solvent system, using a solvent in which the enzyme is at least partially soluble, usually in an amount up to about 50% by volume. Dimethylsulfoxide (DMSO) is especially suitable as solvent together with water or aqueous buffer solution in a mixed solvent system. Using such a mixed solvent system, the desired active enzyme-polymer product is ordinarily obtained in higher yields and conversions to desirably active product, and introduction of desirably high amounts of enzyme activity into the polymer molecule is generally less difficult.

As stated, the polymer selected for such reaction generally contains carboxyl or anhydride linkages, especially where the enzyme contains an amino, hydroxyl (including phenolic hydroxyl), or sulfhydryl group not essential for its enzymatic activity. The polymer is preferably EMA or an EMA-type polymer, but it can be any of those types previously disclosed for coupling or reaction with an enzyme, and in any event it is adapted to effect covalent bonding with the enzyme to produce an enzyme-polymer product either directly or indirectly using an activating agent. Inasmuch as the enzymatic activity of the starting enzyme is desired to be retained in the final product, it is of course firstly necessary that bonding of the enzyme to the polymer be through a group which will not result in inactivation of an active site in the enzyme molecule. Among the various reactive groups of enzyme molecules may be mentioned, besides amino and sulfhydryl, also hydroxyl (including phenolic hydroxyl), carboxyl and imidazolyl. Such groups are present in free or unbound form in inactive portions of enzyme molecules, as in a lysine, cysteine, serine, threonine, histidine, or tyrosine moiety of an enzyme molecule, where the particular moiety in question is not considered essential for enzymatic activity, either catalytic in nature or for substrate binding. Therefore, attachment to the polymer molecule is through reaction of the polymer with such group so as to avoid inactivation of the enzyme during attachment to the polymer molecule. Generally the linkage is an amide, imide, ester, thioester, or disulfide group, such as formed by the carboxyl or anhydride with an amine or hydroxyl group in a non-essential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with groups in the enzyme under mild conditions, the latter favoring retention of enzymatic activity. Such activators are used when a polyacid, e.g., polyacrylic acid, polyamic acid, polyglutamic acid, or like polymers are used.

The polymer selected for such reaction can therefore be said to be adapted to couple or react with the enzyme, either directly or indirectly through use of an activating agent, as already indicated, and in any event to effect covalent bonding with the enzyme. The attachment procedures given are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachment, the protecting atoms being removed subsequent to the attachment reaction.

POLYMERIC MOIETY-CROSSLINKING-WATER-INSOLUBILITY/SOLUBILITY

In its broadest context, the polymer to which the enzyme is to be coupled according to one or more aspects of the invention contains carboxyl or anhydride linkages, especially where the enzyme contains an amino, hydroxyl, or sulfhydryl group not essential for its enzymatic activity. Where an enzyme contains a carboxyl group not essential for activity, the polymer can contain hydroxyl or amine groups for reaction herewith. The polymer may be EMA or an EMA-type polymer, or be any of those types previously disclosed for coupling or reaction with an enzyme, and in any event it is adapted to couple or react with the enzyme to effect covalent bonding and production of the desired enzyme-polymer product.

Since covalent bonding is desired, it is understood that the carrier polymer is tailored to contain at least one reactive site for each polymer molecule with which the enzyme can react, either directly or indirectly, to produce a covalent bond. According to the instant invention, this reactive site (or sites) is peferably a carboxyl or carboxylic anhydride group.

Among the polymers suitable for the practice of the instant invention, polymeric polyelectrolytes having units of the formula $$\left[ \begin{array}{c} -Z-CR_A-(CH_2)_q-CR_B- \\ | \quad \quad \quad \quad \quad \quad \quad \quad | \\ O=C \quad \quad \quad \quad \quad \quad C=O \\ | \quad \quad \quad \quad \quad \quad \quad \quad | \\ X \quad \quad \quad \quad \quad \quad \quad \quad Y \end{array} \right]_n$$

wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, preferably comprising a bivalent carbon chain of 1–4 carbon atoms, inclusive, said carbon chain being part of a unit which contains 1–18 carbon atoms, $q$ is zero or one, X and Y are selected from hydroxy, —O alkali metal, OR, —OH—$NH_3$, —OH—$R_3N$, —OH—$R_2NH$
—OH—$RNH_2$, —NRR', —$(Q)_p$—W—$(NR'R')_x$ and —$(Q)_p$—W—(—OH—$)_x$ wherein $x$ is 1 to 4 and $p$ is zero or one, wherein R is selected from the group consisting of alkyl, phenylalkyl, or phenyl, in each case of 1 to 18 carbon atoms, wherein R' is H or R, wherein Q is oxygen or —NR'—, and wherein W is a bivalent radical preferably selected from lower-alkylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme coupling reaction, or produced as a minor modification of the basic polymer after coupling. Such polymers containing the above-described EMA-type units are hereinafter referred to as in "EMA-type polymer."

Since enzyme molecules have an extremely high molecular weight, even if the polymeric unit exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. Preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—(NR'R')$_x$ wherein R, W and R' have the values previously assigned.

A preferred type of polymeric material useful in the practice of the invention is the polymer of an olefinically unsaturated polycarboxylate acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, $\alpha$, $\alpha$-dimethyl maleic, $\alpha$-butyl maleic, $\alpha$-phenyl maleic, fumaric, aconitic, $\alpha$-chloromaleic, $\alpha$-bromomaleic, $\alpha$-cyanomaleic acids including their partial salts, amides and esters. Anhydrides of any of the foregoing acids are advantageously employed.

Co-monomers suitable for use with the above functional monomers include $\alpha$-olefins such as ethylene, propylene, isobutylene, 1- or 2-butene, 1-hexene, 1-octene, 1-decene, 1-dodecene, 1-octadecene, and other vinyl monomers such as styrene, $\alpha$-methyl styrene, vinyl toluene, vinyl acetate, vinyl amine, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of co-monomers. The preferred starting polymer is an approximately 1:1 copolymer of ethylene and maleic acid.

Thus, water-insoluble enzyme-polymer products are produced by reacting the enzyme with a water-insoluble polymer or by causing the reaction product of the enzyme and polymer to become insoluble either by reaction with a polyfunctional cross-linking agent, such as a polyamine or polyol (including glycol), when this is necessary. The enzyme-polymer product is frequently at least in part insoluble per se because of interaction between the enzyme moiety and additional polymer chains. If the polymer is precrosslinked so as to have a three-dimensional structure or, in some cases, has a sufficiently long linear chain length, the starting polymer is already water-insoluble. Other methods of crosslinking exist and are well known in the art. Further detailed description follows.

Insolubilization via crosslinking can be introduced at any of three stages in the preparation of polymer-enzyme products:

(1) The carrier polymer may be crosslinked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.).

(2) Multifunctional amines, glycols, etc., can be added concurrently with the enzyme in the enzyme-attachment or coupling step.

(3) A multifunctional crosslinking agent may be added to the product after the enzyme has been attached. Such crosslinking agents are added in controllable amounts sufficient to insolubilize the product.

In addition, the enzyme reactant to be attached or coupled to the polymer is commonly multifunctional in itself and thus contributes to the three-dimensional network character of the product. In fact, in many cases, the insolubilization effect in this manner alone is sufficient to impart insoluble characteristics to the product without use of additional crosslinking agents.

When markedly insoluble products are the objective, it is often advantageous to employ copolymers which already contain some crosslinking. Such crosslinked copolymers are known and are obtainable by conducting the polymerization, e.g., the copolymerization of maleic anhydride and hydrocarbon olefin, in the presence of a crosslinking agent, e.g., a compound containing two olefinic double bonds, such as divinylbenzene or vinylcrotonate, poly-1, 2-butadiene or alpha, omega-diolefins. The quantity of crosslinking agent will vary with the degree of insolubility desired, but generally will be on the order of 0.1% to 10% by weight of the total monomer mixture.

As one example of procedure for preparation of the three-dimension polymer network, where necessary or desirable, a difunctional compound can be used for crosslinking a preformed dibasic acid/$C_2$–$C_{18}$ monoolefin copolymer. This can be achieved by reaction between the copolymer and a polyamine, e.g., from 0.1 to 10 mole percent of ethylenediamine. Thus, the quantity of crosslinking of the overall polymer can be controlled. It is understood that ethylenediamine is a typical example of a crosslinking reagent, but many other similar polyamines, can be used for this purpose. Soluble enzyme-polymer products, on the other hand, can advantageously be produced by somewhat different operating procedure.

General procedure for solubles preparation

In order to achieve high yields of aqueously soluble enzyme-polymer products, it is desirable to avoid crosslinking which results in insolubilization.

To prepare soluble enzyme-polymer derivatives, therefore, the reaction is preferably performed under substantially non-crosslinking conditions. The undesired crosslinking can be reduced by performing the attachment reaction in high dilution such that fewer reactions occur between several polymer molecules and a single enzyme molecule. Alternatively, high ratios of enzyme to polymer favor reaction of several enzyme molecules with a single polymer molecule. This, therefore, results in an agglomerated enzyme/polymer system which maintains the desired soluble properties of the individual enzyme molecules. While such procedures as described above are often desirable, it is not always necessary to use dilute solutions or high enzyme/polymer ratios to cause formation of soluble active enzyme/polymer derivatives.

DESCRIPTION OF THE PREFERRED EMBODIMENTS

The following preparations and examples are given by way of illustration only, and are not to be construed as limiting.

Preparations

The general procedure employed for preparation of polymer-enzyme products consisted of allowing cold solutions of enzymes in appropriate buffers to react overnight at 4° C. with the cold, homogenized polymer, e.g., EMA, suspensions. EMA 21 was preferably employed, which had a molecular weight of ca. 20–30,000. Other molecular weight polymers may also be used. For example, EMA 11, having a molecular weight of about 2–3,000, and EMA 31, having a molecular weight of about 60,000, were also employed.

Separation of soluble and insoluble adducts, after reaction, was achieved by centrifugation in the cold (Sorval SS–3 (TM) centrifuge, ca. 10,000 r.p.m. and 10 min. centrifugation time). The soluble adducts were generally exhaustively dialyzed against water in the cold and then lyophilized. Insoluble adducts were washed (and centrifuged), usually ten times with cold buffer and five times with cold distilled water and then lyophilized.

The reaction of the polymer with a plurality of enzymes, as in some of the examples given, can obviously be carried out stepwise, one enzyme at a time, with or without intermediate isolation, or with all enzymes at once. The latter procedure is preferred for reasons of time, convenience, and economy.

The following constitutes a list of representative utilizable polymer-enzyme products, in both water-soluble and water-insoluble form, prepared in accord with the preceding general procedure and having at least a substantial percentage of the enzymatic activity present in the native enezyme, together with increased stability, longer duration of activity, and recoverability for use and recycling:

EMA-Trypsin (IMET & SEMAT),
Chymotrypsin-EMA (EMAC & SEMAC),
Lipase-EMA, Amylase-EMA,
Cellulase-EMA,
B. subtilis neutral and alkaline protease-EMA,
B. subtilis neutral and alkaline protease and Lipase-EMA,
Oxynitrilase-EMA,
Asparaginase-EMA,
Oxynitrilase-polymaleic anhydride polymers,
EMA-papain and zinc papain,
Pepsin-EMA, Acid protease-EMA,
Lipase-styrene/Maleic anhydride copolymers,
Cellulase/neutral and alkaline protease-vinyl methyl ether/maleic anhydride copolymers,
Cellulase-vinyl acetate/maleic anhydride copolymers,
Dextranase-vinyl acetate/maleic anhydride copolymers,
Cellulase/lipase/alkaline protease-dinvyl ether/maleic anhydride cyclocopolymers,
Chymotrypsin-polymaleic anhydride polymers,
Trypsin-polymaleic anhydride polymers,
Asparaginase-polyacrylic anhydride polymers,
Alkaline and neutral protease-polymeric anhydride polymers,
Alkaline protease-polyacrylic anhydride polymers,
B. subtilis neutral and alkaline protease and amylase-EMA, EMA-dextranase, and
EMA-dextranase/neutral protease.

The polymer-enzyme product employed may thus be, for example only, a water-soluble or insoluble product wherein the polymer is selected from the group consisting of ethylene/maleic anhydride copolymer, styrene/maleic anhydride copolymer, vinyl methyl ether/maleic anhydride copolymer, vinylacetate/maleic anhydride copolymers, divinyl ether/maleic anhydride cyclocopolymer, polymaleic anhydride, and polyacrylic anhydride, and wherein the enzyme moiety comprises at least one enzyme selected from the group consisting of acid protease, neutral protease, alkaline protease, trypsin, chymotrypsin, lipase, cellulase, oxynitrilase, pepsin, dextranase, amylase, and papain.

EXAMPLE 1

Cellulase/polymer reaction with cellulose

Soluble and insoluble cellulase/EMA products are prepared by reacting cellulase and EMA-21 (ethylene/maleic anhydride 1:1 copolymer, M.W. ca. 20–30,000) in cold 0.1 M phosphate solution, pH 7.5, separated by centrifugation, and both are isolated by dialysis and lyophilization.

To a Diaplex (TM) apparatus with an attached UM–1(TM) membrane is charged a 350 ml. 0.0001 M phosphate solution, pH 7.5, containing 150 mg. soluble cellulase/EMA product. To this solution is added 500 mg. α-cellulose fiber (Sigma Chemical Co.) and the mixture is stirred at room temperature for twenty-four hours. Pressure (50 p.s.i.) is applied to the mixture and the solution which passes through the membrane is collected and assayed for glucose as by the Glucostat (TM) method (Worthington Biochemical Co.). The glucose thus produced can be isolated by the usual techniques only as lyophilization.

The cellulase/EMA which remains behind in the Diaplex (TM) apparatus is washed with water and the chamber is recharged with dilute buffer and cellulose. The mixture is stirred and the glucose thus formed is again isolated as described.

In the same manner, insoluble cellulase/EMA is employed as described above. The yield of glucose formed under comparable time periods and conditions is, however, less than that formed when employing the soluble cellulase/EMA.

Other polymer-cellulase products from the preparations may be used in place of the cellulase-EMA product employed herein with substantially the same results.

EXAMPLE 2

Lipase/polymer reaction with olive oil

Soluble and insoluble lipase/EMA products are prepared by reaction of lipase and EMA in cold 0.1 M phosphate solution, pH 7.5, separated by centrifugation, and both are isolated by dialysis and lyophilization.

A Diaplex (TM) apparatus with an attached UM–1 (TM) membrane is charged with a 325 ml. quantity of commercial lipase substrate, in olive oil emulsion, and 200 mg. of soluble lipase/EMA product. The mixture is stirred at room temperature for twenty-four hours. Pressure (50 p.s.i.) is applied to the mixture and the solution which passes through the membrane is collected and assayed for free fatty acids such as by titration with standard sodium hydroxide solution. The fatty acids thus produced can be isolated by the usual techniques such as lyophilization and/or extraction into organic solvents.

The lipase/EMA which remains behind in the Diaplex (TM) apparatus is washed with water and the chamber is recharged with olive oil emulsion. The mixture is stirred and the fatty acids thus formed are again isolated as described. The same result is produced when other lipids are employed as starting substrate.

In the same manner, insoluble lipase/EMA is employed as described above. The yield of fatty acids formed under comparable time periods and conditions is, however, less than that formed when employing the soluble lipase/EMA.

Use of other polymer-lipase products from the preparations in the process of this example gives substantially the same results.

EXAMPLE 3

Oxynitrilase/polymer reaction with DL-mandelonitrile (stereoselective formation of L-mandelonitrile)

Soluble and insoluble oxynitrilase/EMA products are prepared by reaction of oxynitrilase and EMA in cold 0.1 M phosphate, pH 7.5; separated by centrifugation, and both are isolated by dialysis and lyophilization.

To the Diaplex (TM) apparatus with an attached UM-2 membrane, is charged 5 g. DL-mandelonitrile in 300 ml. 50% methanol/acetate buffer, pH 5.4. The solution is purged with nitrogen, 250 mg. soluble oxynitrilase/EMA is added, and the mixture is stirred under a nitrogen atmosphere in the cold. Pressure (50 p.s.i) is applied using nitrogen and the solution passing through the membrane is collected. To isolate the L-mandelonitrile the methanol is removed in vacuo and the solution is extracted with chloroform or ether. The organic extracts are then washed with saturated sodium bisulfite (to remove benzaldehyde which is formed as a result of reaction of the oxynitrilase/EMA product with the D-mandelonitrile), followed by water and dried. The L-mandelonitrile is obtained as a low melting solid by removal of the organic solvent. The optical purity is dependent upon the reaction time of the oxynitrilase/EMA with the DL-mandelonitrile and, based upon optical rotation in chloroform, the optical purity is between 60 and 97%.

The soluble oxynitrilase/EMA product which remains behind in the Diaplex (TM) apparatus is washed thoroughly with water and the chamber is recharged with DL-mandelonitrile. The mixture is stirred and the L-mandelonitrile thus formed is isolated as described.

In the same manner, insoluble oxynitrilase/EMA product is employed as described above. The yield of L-mandelonitrile formed under comparable conditions has comparable optical purity to that obtained when employing the soluble oxynitrilase/EMA product.

Use of other oxynitrilase-polymer products in the process of this example gives substantially the same result.

EXAMPLE 4

Oxynitrilase/polymer reaction with benzaldehyde and hydrogen cyanide (formation of D-mandelonitrile)

To the Diaplex (TM) apparatus with an attached UM-2 membrane, is charged an aqueous solution that is 0.2 M in benzaldehyde (freshly purified) and 0.3 M in hydrogen cyanide, pH 5.4. To this solution is added 350 mg. soluble oxynitrilase/EMA, the mixture is carefully purged with nitrogen, and the mixture is stirred in the cold under a nitrogen atmosphere overnight. At this time pressure (50 p.s.i.) is applied and the solution is allowed to pass through the membrane. The thus-formed D-mandelonitrile is isolated by extraction into an organic solvent, washing same with saturated sodium bisulfite, drying and removal of the organic solvent. The yield of D-mandelonitrile is ca. 75–90% and it has an optical purity of 75 to 95%.

The soluble oxynitrilase/EMA product which remains behind in the Diaplex (TM) apparatus is washed thoroughly with water and the chamber is recharged with a benzaldehyde-hydrogen cyanide solution. The mixture is stirred and the D-mandelonitrile product is again isolated as described.

In the same manner, insoluble oxynitrilase/EMA product is employed as described above. The yield of D-mandelonitrile formed under comparable conditions has comparable conditions has comparable optical purity to that obtained when employing the soluble oxynitrilase/EMA product.

Use of other polymer-oxynitrilase products in the process of this example gives substantially the same result.

EXAMPLE 5

Stereoselective hydrolysis of DL-tryptophane methyl ester catalyzed by soluble and insoluble trypsin/polymer products In a Diaplex (TM) apparatus with an attached UM-1 (TM) membrane is added 75 ml. water wherein is dissolved 1.5 g. of tryptophane methyl ester and the solution is adjusted to pH 8.2 with dilute sodium hydroxide. Insoluble trypsin/EMA (71.7 mg.) is added and the mixture is stirred. After ca. 64% hydrolysis has occurred (as measured by titration of an aliquot), the solution is allowed to pass through the membrane and the tryptophane is isolated by the method of Greenstein (J. P. Greenstein in "Methods of Enzymology," S. P. Colowich and N. O. Kaplan (eds.), Academic Press, New York, 1957, vol. III, p. 554). The product possesses optical rotation of $[\alpha]_D$ —4.8 (c.=1, $H_2O$), indicating an enrichment of 16% of L-tryptophane in the product. The insoluble trypsin/EMA product which remains in the Diaplex (TM) apparatus is washed with water and the chamber is recharged with the substrate, DL-tryptophane methyl ester. Allowing the reaction to proceed in an analogous manner yields tryptophane which is 23% enriched in the L-isomer.

In another example, the tryptophane methyl ester which is isolated after the reaction possessed an optical activity of $[\alpha]_D$ +1.2, indicating an enrichment of ca. 4% of the D-isomer. Other tryptophane esters, especially lower-alkyl esters, and tryptophane amide, can similarly treated with substantially identical results, as can other geometric and optical isomeric mixtures of esters whether or not biologically active.

In a similar manner to that described above, the soluble trypsin/EMA product is utilized to catalytically hydrolyze the DL-tryptophane methyl ester. After passage through the membrane, the isolated tryptophane is enriched in the L-isomer by 32% and the isolated tryptophane methyl ester is enriched in the D-isomer by 30%.

The soluble trypsin/EMA product which remains behind in the Diaplex (TM) apparatus is washed with water and the chamber is recharged with the substrate, DL-tryptophane methyl ester. Allowing the reaction to proceed in an analogous manner yields tryptophane which is 42% enriched in the L-isomer. The isolated unhydrolyzed tryptophane methyl ester is enriched in the D-isomer by 44%.

Use of other polymer-trypsin products from the preparations according to the process of this example gives substantially the same results.

EXAMPLE 6

Asparaginase-polymer reaction with asparagine

Soluble and insoluble Asparaginase-EMA products are prepared by reacting Asparaginase and EMA-21 (ethylene/maleic anhydride 1:1 copolymer, M.W. ca. 20–30,000) in cold 0.1 M phosphase solution, pH 7.5, separated by centrifugation, and both are isolated by dialysis and lyophilization.

To a Diaplex (TM) apparatus with an attached UM-2 (TM) membrane is charged a 350 ml. 0.001 M phosphate solution, pH 7.5, containing 150 mg. soluble asparaginase-EMA product. To this solution is added 500 mg. of L-asparagine and the mixture is stirred at room temperature for twenty-four hours. Pressure (50 p.s.i.) is applied to the mixture and the solution which passes through the membrane is collected and assayed for aspartic acid. The aspartic acid thus produced is isolated by the usual techniques such as extraction.

The asparaginase-EMA which remains behind in the Diaplex (TM) apparatus is washed with water and the chamber is recharged with dilute buffer and asparagine. The mixture is stirred and the aspartic acid thus formed is again isolated as described.

In the same manner, insoluble asparaginase-EMA is employed as described above. The yield of aspartic acid formed under comparable time periods and conditions is comparable to that formed when employing the soluble asparaginase-EMA.

Use of other asparaginase-polymer products, as from the preparations, in the process of this example, produces substantially the same result.

EXAMPLE 7

SEMAT digestion of RIBOX (performic acid oxidized bovine ribonuclease)

An Amicon Corp. (Cambridge, Mass.) 50 ml. Diaplex (TM) apparatus with an attached UM–1 (TM) membrane (exclusion limits 10,000 MW), oxidized RIBOX (20 mg.) and SEMAT solution (200X) (3.29 mg./ml.) in 20 ml. ammonium carbonate buffer, pH 9.5, were placed in the chamber and the mixture allowed to stand overnight.

Pressure was applied and the solution passing through the membrane was collected. The chamber was recharged with 20 ml. RIBOX (20 mg.) in ammonium carbonate buffer, pH 9.5, and the reaction allowed to proceed again. The first solution was lyophilized. The second solution was collected and lyophilized.

Paper chromatography for 6 hours using samples of both runs and undigested RIBOX gives patterns different from those of undigested RIBOX as determined by ninhydrin.

Use of other soluble trypsin-polymer products, in the process of this example, produces substantially the same results.

EXAMPLE 8

Each of the additional soluble and insoluble polymer-enzyme products listed in the foregoing preparations is employed in the same or substantially the same manner as given in the foregoing examples, employing a selected substrate upon which the polymer-enzyme product is enzymatically active, and recovering the products of the reaction after passage through the membrane while retaining at least the polymer-enzyme product, preferably in soluble form for intimacy of contact with the substrate, within the enzymatic reaction zone for recycling, if desired after washing with water or dilute aqueous buffer solution. For example, the pepsin-polymer papain-polymer and proteinase-polymer products and protein, e.g., casein, the amylase-polymer products and starch; the dextranase-polymer products and dextran; the chymotrypsin-polymer products and milk; urease-polymer products and urea, and so on.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

It will be apparent from the foregoing that the product of the reaction may be of a lower molecular weight than starting substrate or that it may be of a higher molecular weight than starting substrate, as when substrate comprises a plurality of reactants which are enzymatically reacted together to give a higher molecular weight product. Therefore, the term "lower molecular weight" as applied to reaction product in the appended claims is to be understood as being in contrast to the molecular weight of the EPP or SEPP employed, and not necessarily in contrast to the molecular weight of starting substrate, unless otherwise so specified.

I claim:

1. Process for the enzymatic processing of a substrate which is subject to enzymatic action employing a water-soluble enzyme-polymer product (SEPP) in which the polymer comprises a bivalent carbon chain of 1–4 carbon atoms, inclusive, said carbon chain being part of a unit which contains 1–18 carbon atoms, in which the enzyme is covalently bound which permits recovery of products of the enzymatic reaction substantially free of contamination by SEPP, which comprises the steps of containing the starting substrate and SEPP in solution in a reaction chamber comprising an exit closed by a semipermeable membrane having exclusion limits permitting passage therethrough of lower molecular weight materials and precluding passage therethrough of higher molecular weight materials, said exclusion limits being selected to permit passage therethrough of products of the reaction but to exclude passage therethrough of starting SEPP, maintaining the reactants in contact in solution for a determined period, and recovering a lower molecular weight product of the reaction substantially free of contamination by SEPP after passage of said product through said semipermeable membrane.

2. Process of claim 1, wherein the starting substrate is also of a molecular weight which is precluded from passage through said semi-permeable membrane and wherein said product of the reaction is recovered substantially free of starting SEPP and also of the starting substrate.

3. Process of claim 1, wherein the substrate is of sufficiently low molecular weight so as to be permitted passage through said semi-permeable membrane along with product of the reaction.

4. Process of claim 1, wherein the starting SEPP is water-soluble cellulase/EMA and wherein the starting substrate is cellulose and wherein the product of the reaction is glucose.

5. Process of claim 1, wherein the starting SEPP is water-soluble lipase/EMA and wherein the substrate is a lipid and wherein the product of the reaction is a fatty acid.

6. Process of claim 5, wherein said lipid is olive oil.

7. Process of claim 1, wherein said starting SEPP is oxynitrilase/EMA and wherein said starting substrate is DL-mandelonitrile and wherein the product of the reaction is L-mandelonitrile.

8. Process of claim 1, wherein said starting SEPP is water-soluble oxynitrilase/EMA and wherein said starting substrate is benzaldehyde plus hydrogen cyanide and wherein said reaction product is D-mandelonitrile.

9. Process of claim 1, wherein said starting SEPP is water-soluble EMA/trypsin and wherein said starting substrate is an ester or amide of tryptophane and wherein said product of the reaction is tryptophane.

10. Process of claim 9, wherein said ester of said tryptophane is a lower-alkyl ester of tryptophane.

11. Process of claim 1, wherein said starting substrate is RIBOX and wherein said starting SEPP is water-soluble EMA/trypsin.

12. Process of claim 1, wherein said starting SEPP is water-soluble EMA/asparaginase and wherein said starting substrate is asparagine and wherein said reaction product is aspartic acid.

13. Process of claim 1, wherein said starting substrate is selected from the group consisting of proteins and polypeptides.

14. Process of claim 1, wherein additional substrate is thereafter charged to said reaction chamber.

15. Process of claim 14, wherein the polymer-enzyme product SEPP is washed by passage therethrough of solvent prior to reuse in the process.

16. Process of claim 1, wherein substrate in solution is fed into said reaction chamber in a continuous or semi-continuous manner.

17. Process of claim 16, wherein feeding of substrate is effected during the maintenance of a pressure differential on opposite sides of said membrane.

18. Process of claim 1, wherein SEPP is recovered from the reaction chamber upon completion of the reaction.

(References on following page)

References Cited

UNITED STATES PATENTS

| | | | |
|---|---|---|---|
| 3,186,917 | 6/1965 | Gethardt et al. | 195—103.5 X |
| 3,425,839 | 2/1969 | Pinnegar | 99—31 |

FOREIGN PATENTS

| | | | |
|---|---|---|---|
| 659,059 | 3/1963 | Canada | 195—63 |

OTHER REFERENCES

Mitz, et al., Nature, vol. 189 February 1961, pp. 576–577.

Levin, et al., Biochemistry, vol. 3, No. 12, December 1964, pp. 1905–1912.

Crook, E. M., Biochem. J., vol. 107, March 1968, pp. 1p and 2p.

Lilly, et al., Biochem. J., vol. 107, March 1968, p. 5p.

A. LOUIS MONACELL, Primary Examiner

D. M. NAFF, Assistant Examiner

U.S. Cl. X.R.

195—63, DIG. 11

UNITED STATES PATENT OFFICE
CERTIFICATE OF CORRECTION

Patent No. 3,649,457                     Dated March 14, 1972

Inventor(s) THOMAS L. WESTMAN

It is certified that error appears in the above-identified patent and that said Letters Patent are hereby corrected as shown below:

| PATENT READS: | APPLICATION READS: |
|---|---|
| Col. 8, Line 50<br>"but many other similar" | Page 15, Line 25<br>---but many other compounds, such as the group of alkylene and other similar--- |
| Col. 9, Line 60<br>"-polymeric" | Page 18, Line 4<br>---  -Polymaleic--- |
| Col. 10, Line 17<br>"0.0001 M" | Page 18, Line 30<br>---0.001 M--- |
| Col. 10, Line 26<br>"only as" | Page 19, Line 6<br>---such as--- |
| Col. 11, Lines 69 & 70<br>"under comparable conditions has comparable conditions has comparable optical purity" | Page 22, Line 3<br>---under comparable conditions has comparable optical purity- |

Signed and sealed this 18th day of July 1972.

(SEAL)
Attest:

EDWARD M. FLETCHER, JR.                ROBERT GOTTSCHALK
Attesting Officer                      Commissioner of Patents